US012806641B2

(12) United States Patent
Rother et al.

(10) Patent No.: US 12,806,641 B2
(45) Date of Patent: Nov. 24, 2026

(54) DISPENSING DEVICE FOR A FLUID

(71) Applicant: Aero Pump GmbH, Hochheim/Main (DE)

(72) Inventors: Sebastian Rother, Mainz (DE); Milena Angelika Marszalek, Mainz (DE); Andreas Mersmann, Hochheim/Main (DE)

(73) Assignee: Aero Pump GmbH, Hochheim/Main (DE)

( * ) Notice: Subject to any disclaimer, the term of this patent is extended or adjusted under 35 U.S.C. 154(b) by 154 days.

(21) Appl. No.: 18/785,248

(22) Filed: Jul. 26, 2024

(65) Prior Publication Data

US 2025/0033071 A1 Jan. 30, 2025

(30) Foreign Application Priority Data

Jul. 27, 2023 (EP) .................................... 23188139

(51) Int. Cl.
*B05B 11/00* (2023.01)
*B05B 1/08* (2006.01)

(52) U.S. Cl.
CPC ............ *B05B 11/0067* (2013.01); *B05B 1/08* (2013.01)

(58) Field of Classification Search
CPC .............................. B05B 11/0057; B05B 1/08
USPC .......................................................... 222/422
See application file for complete search history.

(56) References Cited

U.S. PATENT DOCUMENTS 4,830,284 A * 5/1989 Maerte ................ B05B 11/1023 239/487
5,842,616 A 12/1998 Ruscitti et al.
8,328,120 B2 * 12/2012 Vanblaere ........... B05B 11/0067 239/533.1
10,155,243 B2 12/2018 Mersmann
2008/0017666 A1 * 1/2008 Vanblaere ........... B05B 11/0067 222/380

(Continued)

FOREIGN PATENT DOCUMENTS

EP 3 072 597 9/2016
FR 3 041 548 3/2017
FR 3041548 A1 * 3/2017 ......... B05B 11/0067

OTHER PUBLICATIONS

Machine translation of FR-3041548-A1.*
Extended Europe Search Report (EESR) conducted in counterpart Europe Appn. No. 23188139.2 (Jan. 5, 2024).

*Primary Examiner* — Jeremy Carroll
(74) *Attorney, Agent, or Firm* — GREENBLUM & BERNSTEIN, P.L.C.

(57) ABSTRACT

A dispensing device for dispensing a fluid includes a head base piece having a dispensing opening, a liner arranged inside of the head base piece, a liner channel that is arranged between the head base piece and the liner, and a valve element that is movably arranged, at least in regions, inside of the liner and interacts with the dispensing opening. The valve element can be transferred from a first position into a second position via a stroke relative to the liner. In the second position of the valve element, a fluid path is formed between the liner channel and the dispensing opening, whereby a dispensing of fluid is rendered possible. A dispensing of fluid in the first position of the valve element is thereby prevented with a low number of components in that the liner channel is sealed against the dispensing opening by the liner.

17 Claims, 7 Drawing Sheets

(56) References Cited

U.S. PATENT DOCUMENTS

| | | | | |
|---|---|---|---|---|
| 2009/0084872 | A1* | 4/2009 | Vanblaere | B05B 11/0067 239/67 |
| 2023/0150751 | A1* | 5/2023 | Zembrod | B05B 1/3463 222/402.13 |
| 2025/0339867 | A1* | 11/2025 | Greiner-Perth | A61M 16/1055 |

* cited by examiner

DISPENSING DEVICE FOR A FLUID

CROSS-REFERENCE TO RELATED APPLICATION

This application claims priority under 35 U.S.C. § 119(a) to Europe Application No. 23188139.2 filed Jul. 27, 2023, the disclosure of which is expressly incorporated by reference herein in its entirety.

BACKGROUND

1. Field of the Invention

Embodiments relate to a dispensing device for dispensing a fluid. A dispensing device of this type can include a head base piece having a dispensing opening, a liner arranged inside of the head base piece, a liner channel that is arranged between the head base piece and the liner, and a valve element that is movably arranged, at least in regions, inside of the liner and interacts with the dispensing opening. The valve element can be transferred from a first position into a second position via a stroke relative to the liner. In the second position of the valve element, a fluid path is formed between the liner channel and the dispensing opening.

2. Discussion of Background Information

EP 3 072 597 A1 describes a dispensing device of this type for dispensing predetermined amounts of fluid. However, in order that the fluid being dispensed does not exit from the dispensing opening at a great speed during a small stroke of the valve element in said dispensing device, the valve element, or the cylinder thereof, interacts with the dispensing opening so that, in a closed state, the dispensing opening is sealed by the valve element and even a small stroke does not clear the dispensing opening. Only a sufficiently large stroke of the valve element clears the fluid path from a chamber arrangement to a nozzle chamber, together with the dispensing opening.

This structural design of the dispensing device allows the use of the dispensing device as a dropper, e.g., for eye drops. A dropper is thereby characterized by a discharge of fluid in the form of drops. Likewise, with the structural design of the dispensing device, the suitability thereof for use with medical fluids is improved.

However, it has proven disadvantageous that, for the known dispensing device, a large number of components is necessary. In addition, the known design of the dispensing device requires an elaborate design of the components.

For the dispensing device, it is necessary, for example, that the dispensing device include an extra sealing element which seals a valve chamber against a nozzle chamber during a small stroke and functions as a valve seat. Additionally, it is necessary that the valve element include a cylinder which interacts with the dispensing opening and likewise seals the dispensing opening using a positive fit. However, the use of a large number of components and the complex design thereof increases the production costs and renders the dispensing device susceptible to errors.

In addition, the known design of the dispensing device can result in it not being possible to fully dispense the fluid from the nozzle chamber, and not already at low pressure. In particular, this is because a large force is needed for the stroke to clear the dispensing opening, since a small stroke is not sufficient to open to the dispensing opening. The spring path traveled to open the dispensing opening and the accompanying spring force then result in a faster closing of the dispensing opening. Accordingly, not only does a larger force need to be applied to open the dispensing opening, the dispensing device or the valve element also close the dispensing opening again more quickly. Especially because of the faster closing, residual fluid can remain in the nozzle chamber. In the case of longer intervals between a further use of the dispensing device, said residual fluid can produce a negative effect.

SUMMARY

Embodiments provide an alternative dispensing device with a simplified design. At the same time, the embodiments provide a valve mechanism which has an improved opening and closing characteristic.

According to embodiments, the liner channel of a dispensing device of the aforementioned type, which is configured to dispense a fluid/liquid, is sealed against the dispensing opening by the liner in the first position of the valve element. This means that no fluid can flow from the liner channel to the dispensing opening, since the fluid path is interrupted by the liner.

This embodiment of the dispensing device offers the advantage that no additional sealing element that seals the liner channel against the dispensing opening is necessary, so that the number of components and the production costs can be lowered.

The fluid that the dispensing device can dispense is preferably a medical or cosmetic active ingredient solution, for example for use in the nose, mouth, or eyes of a user of the dispensing device. In addition, the dispensing preferably occurs in the form of drops, that is, the dispensing device is preferably a dropper. The head base piece of the dispensing device essentially forms the enclosure part of the dispensing device that is configured to dispense the fluid and, accordingly, includes a dispensing opening. The dispensing opening can thereby have the shape of a calotte. The head base piece can be provided with a closing cap which must be removed from the head base piece prior to the use of the dispensing device. Inside of the head base piece, a liner is arranged which extends away from the dispensing opening in an axial direction, that is, in a longitudinal direction of the dispensing device.

The liner is a tubular, essentially cylindrical body with a wall and a cavity. Correspondingly, the liner includes an inner wall and an outer wall. The liner is also embodied in one piece. Located between the head base piece and the liner arranged in the head base piece is a liner channel, which is used for the transport of fluid towards the dispensing opening of the dispensing device. The liner channel is thus preferably arranged between the outer wall of the liner and the inner wall of the head base piece. Preferably, the liner channel ends in a region, for example a chamber arrangement with a valve chamber, which is arranged in particular on a side of the valve element facing away from the dispensing opening. This means that the region is not in fluid connection with the dispensing opening in the first position of the valve element, though the region is arranged in the interior of the liner. Accordingly, the liner channel enables the fluid to be transported from the outer wall of the liner into the interior of the liner. Furthermore, a valve element is arranged, at least in regions, inside of the liner, which valve element is arranged such that it can be moved relative to the liner. The valve element can thus be displaced relative to the liner in an axial direction, for example. The valve element can thereby be transferred from a first position into a second position via a stroke. In the first position, the fluid path from the liner channel towards the dispensing opening is interrupted, meaning that a fluid cannot flow from the liner channel to the dispensing opening. Once the valve element is transferred from the first position into the second position, the fluid path between the liner channel and the dispensing opening is cleared, so that a fluid can exit from the dispensing opening.

The valve element, which is located inside of the liner, thereby interacts with the liner. The liner thereby forms a valve seat in which the valve element is movably arranged. In a first position, the valve element bears against the dispensing opening and closes off said dispensing opening, preferably with a force fit. For this purpose, the valve element can include rounded edges or a radial surface which bears against the dispensing opening and seals said dispensing opening. This surface is also called the closing surface. Here, the valve element can additionally include a pin in one embodiment. The pin can have cylindrical shape or a different shape, for example a cone shape, wherein the pin protrudes into the dispensing opening in the first position of the valve element. However, the pin does not bear against the dispensing opening and, accordingly, does not perform any sealing function at all. A gap can be arranged between the pin and the dispensing opening, for example. Furthermore, in the first position of the valve element, the dispensing opening is still sealed by the closing surface. However, in the first position of the valve element, the pin can already be seated in the dispensing opening, that is, it can penetrate into the dispensing opening. The use of a pin can reduce the dead volume in the outer region of the dispensing device. Accordingly, deposits of debris can be partially minimized thereby. In addition, in a second (open) position of the valve element, the pin can improve the drip behavior of the fluid, for example in that less fluid collects at the calotte. This facilitates the subsequent drying of residual fluid after a drip process has occurred. Once the valve element is transferred into a second position, the fluid path between the liner channel and the dispensing opening is cleared. Here, a small displacement of the valve element is already sufficient to open the dispensing opening. The interruption of the fluid path in the first position of the valve element can thereby cause the fluid to be retained in the first position of the valve element until the valve element is moved, for example due to the fluid pressure, and clears the dispensing opening. As a result, a controlled dispensing of the fluid in the form of drops is possible, if necessary along the pin.

In one embodiment, the liner includes at least a second sealing lip or a sealing surface which bears against the valve element in the first position of the valve element. The liner can in this case have, at least in regions, a pretension in order to thus press the sealing lip or the sealing surface against the valve element. The sealing surface thereby denotes a surface section of the liner which, at least in regions, bears flat against the valve element in the first position of the valve element. Preferably, the sealing surface or the sealing lip is located in a region of the liner with a reduced diameter. Accordingly, due to the bearing of the liner against the valve element with the aid of the sealing lip or the sealing surface, there results a fluid-tight contact between the liner and the valve element as long as the valve element is located in the first position. The interruption of the fluid path is therefore characterized in that the liner, that is, the second sealing lip or the sealing surface for example, bears in regions against the valve element in the first position, and thus blocks or seals the fluid path. During a stroke of the valve element from the first into the second position, the bearing of the second sealing lip or the sealing surface against the valve element ends, at least to the extent that the fluid path is no longer blocked or sealed. A through-opening between the valve chamber and nozzle chamber is thus opened, and a corresponding fluid path is cleared. The fluid from the liner channel can pass through the liner and flow to the dispensing opening. For this purpose, the valve element can comprise a space, for example a groove, which forms a portion of the fluid path. Once the valve element is moved from the first position into the second position, said space of the valve element is cleared, so that the fluid can pass by the valve element and can flow from the liner channel to the dispensing opening. Alternatively, the valve element can also easily be moved far enough that the (second) scaling lip or the sealing surface no longer bears against the valve element. This can be achieved in that the valve element comprises two sections of a differing diameter. Accordingly, a controlled transport of the fluid in the form of drops is possible.

In a further embodiment, the liner comprises a breach which forms a portion of the fluid path. As long as the valve element is located in the first position, the fluid cannot flow from the liner channel to the dispensing opening. The liner channel, which is arranged between the head base piece and the liner, guides the fluid along the dispensing device in the direction of the dispensing opening. The liner channel ends preferably in a region of the valve element that faces away from the dispensing opening. According to the embodiment, the fluid which enters into the interior of the liner from the outer wall of the liner, flows through a breach in this case, so that the breach forms a portion of the fluid path. The fluid can thus, for example, move from the liner channel into a chamber arrangement that is sealed against the dispensing opening as long as the valve element is located in the first position. Alternatively, however, the liner could, for example, also comprise a permeable region that allows the passage of fluid from the outer wall of the liner into the interior of the liner. However, the breach, which can be embodied in the form of a bore, a channel, or the like for example, allows an accelerated transport of fluid between the liner channel and the dispensing opening, provided that said dispensing opening has been cleared by the valve element.

In a further embodiment, the liner, at least in regions, tapers conically towards the dispensing opening. Here, the inner contour formed by the inner wall of the liner can, for example, conically taper in the region of the valve seat. This means that an inner diameter of the liner in a region closer to the dispensing opening is smaller than an inner diameter of the liner in a region farther away from the dispensing opening. When the valve element moves inside of the liner relative thereto in a longitudinal direction of the liner, that is, axially, and performs a stroke, the valve element moves from a region in which the inner diameter of the liner is smaller to a region in which the inner diameter of the liner is larger. Preferably, the outer contour of the head base piece additionally also tapers conically towards the dispensing opening in the region of the dispensing opening. Here, the conical taper of the liner ensures a reliable valve seat, particularly in the first position of the valve element. In addition, with the conical taper of the head base piece, a dispensing device having a reduced diameter in the region of the dispensing opening is created. As a result, the dispensing device can, for example, be better guided into the mouth, into the nose, or toward the eye, without touching said body parts.

In addition, the valve element can, in a further embodiment, comprise a first sealing lip which bears against the liner in the first and in the second position of the valve element. Said first sealing lip therefore bears against the inner wall of the liner independently of whether the dispensing device is open or closed, that is, whether it is located in the first or the second position. The first sealing lip thereby seals a region in which the fluid enters into a chamber arrangement from the liner channel, for example through a breach, against a rearward region that is farther away from the dispensing opening and can comprise a spring space with a head spring. When the valve element is displaced from the first position into the second position in a longitudinal direction of the dispensing device, the first sealing lip can perform a guiding function. Furthermore, the first sealing lip can prevent a tilting of the valve element, provided that the valve element exits the valve seat formed by the second sealing lip of the liner. Additionally, the first sealing lip can form a type of screen against which the fluid presses, so that the valve element is displaced. If the dispensing device comprises a head spring, the force that is applied to the valve element by the fluid pressure and is directed away from the dispensing opening must be greater than the spring force that presses the valve element in the direction of the dispensing opening. The arrangement of a first sealing lip thus improves the transfer of the valve element from the first into the second position.

Furthermore, the liner can include a shoulder in the region of the valve element. Said shoulder can be embodied in the form of a flange section. The shoulder is essentially characterized by an abrupt change in the diameter of the liner, in particular in the inner diameter of the liner. This means that the liner essentially comprises two regions having a differing inner diameter, wherein the transition region between said regions forms the shoulder or flange section. Preferably, the one, second sealing lip is arranged in the region of the liner having the smaller diameter. The first sealing lip of the valve element, on the other hand, is preferably located in the region of the liner having the larger inner diameter. In the first position, the valve element preferably also bears against the inner wall of the liner both in the region with the smaller diameter and also in the region with the larger diameter. In addition, the liner preferably includes no shoulder between the breach and the end of said liner facing away from the valve element. The arrangement of a shoulder thereby offers the possibility that a predetermined abrupt clearance of the fluid path can occur during a stroke movement of the valve element.

In a further embodiment, the dispensing device includes a chamber arrangement and/or a nozzle chamber, wherein the chambers form a portion of the fluid path. The chamber arrangement thereby denotes a region which, as long as the valve element is located in a first position, lies on the side of the valve element that faces away from the dispensing opening. The fluid path between the chamber arrangement is thus interrupted in the first position of the valve element relative to the dispensing opening. The chamber arrangement can thereby form a portion of the fluid path. By contrast, the nozzle chamber denotes a region which, as long as the valve element is located in a first position, is located on the side of the valve element that faces the dispensing opening. The dispensing opening is thereby part of the nozzle chamber, wherein the dispensing opening is closed off by the valve element, preferably with a force fit, in the first position. If the dispensing device comprises a chamber arrangement and a nozzle chamber, wherein said chambers are part of the fluid path, said fluid path is interrupted between the chamber arrangement and nozzle chamber by the interaction of the liner and valve element in the first position of the valve element. Once the valve element is transferred into the second position, a fluid connection between both chambers is created, that is, between the chamber arrangement and the nozzle chamber, so that the complete fluid path leads from the liner channel through the nozzle chamber towards the dispensing opening via the chamber arrangement, past the valve element. The provision of the corresponding chambers can be advantageous in multiple respects. In particular, a predefined amount of fluid can thereby be designated for dispensing, for example. At the same time, the chambers can also ensure that a corresponding fluid pressure that displaces the valve element is built up. In addition, the flow velocity of the fluid can be regulated via the volumes of the chambers.

In a further embodiment, the liner channel and the chamber arrangement are in fluid connection in the first position of the valve element. As a result, the chamber arrangement is also accessible to the fluid in the first position of the valve element, so that the fluid can flow into the chamber arrangement from the liner channel. In this case, a portion of the chamber arrangement can be formed by a valve chamber. The fluid of the valve chamber is thereby in contact with the valve element. The liner channel opens into the chamber arrangement. However, as long as the valve element is located in the first position, the fluid path from the chamber arrangement to the dispensing opening is interrupted. The interruption of the fluid path causes the fluid to be retained in the chamber arrangement. Correspondingly, there results a collection of a certain amount of fluid in the chamber arrangement, which amount cannot, however, advance to the dispensing opening. In this case, the collection of the fluid can produce a pressure that acts on the valve element, so that said valve element is moved away from the dispensing opening when there is a sufficient pressure. The first sealing lip can in this case form a type of screen on which the pressure acts.

In a further embodiment, the liner channel and the nozzle chamber are not in fluid connection in the first position of the valve element. The fluid path to the nozzle chamber is interrupted in the first position of the valve element, so that no fluid can advance into the nozzle chamber. Accordingly, there is no fluid connection between the liner channel and the nozzle chamber, so that the liner channel is sealed against the dispensing opening, that is, no fluid can flow from the liner channel to and out of the dispensing opening. Once the valve element is transferred from the first position thereof into the second position, the fluid passes through the fluid path in the direction of the nozzle chamber and the dispensing opening. Independently of whether the dispensing device comprises a chamber arrangement or not, the fluid can be decelerated upon entering into the nozzle chamber by an expansion into the volume of the nozzle chamber, whereby the amount of fluid which has reached the nozzle chamber can then exit from the dispensing opening in a controlled manner. For this purpose, the nozzle chamber can have a larger volume than, for example, the space at the valve element which connects the liner channel and the nozzle chamber. Depending on the application case of the dispensing device, the volume sizes of the nozzle chamber, of the space, and/or of the chamber arrangement can, however, also be chosen in a different ratio to one another. For example, an expansion of the fluid into the space can also already occur at the valve element. A fluid accelerated in a passage with a smaller volume or cross section is thus decelerated in the volume with a larger cross section, for example in the nozzle chamber, and can then exit from the dispensing opening. A dispensing in the form of drops can be enabled by the deceleration process. In this case, the fluid can exit along the calotte in the form of drops.

According to an alternative embodiment, the dispensing opening and the nozzle chamber and/or the chamber arrangement and the liner channel are in fluid connection in the second position of the valve element. This means that, depending on whether the dispensing device comprises both a nozzle chamber and a chamber arrangement, or only a nozzle arrangement or only a chamber arrangement, the fluid will flow out of the dispensing opening from the liner channel through the corresponding chambers in the second position of the valve element. In the second position of the valve element, the fluid path is therefore no longer sealed. The complete opening of the fluid path, together with the chambers, has at least the advantages previously mentioned above.

In addition, in a further embodiment, the liner protrudes, at least in regions, into the nozzle chamber. The nozzle chamber, which in the region of the dispensing opening is formed by a region of the head base piece, is thus decreased by the volume of the liner region that protrudes into the nozzle chamber. The liner, embodied in one piece, can thereby be braced against the head base piece and guarantee a reliable valve seat.

In a further embodiment, the liner is immovably arranged relative to the head base piece. Accordingly, in the case of a movement of the valve element, no movement of the liner relative to the head base piece takes place. This fixed arrangement simplifies the design, since essentially only the movement of one component, namely the movement of the valve element, must be controlled.

According to a further embodiment, the valve element can seal the dispensing opening with a force fit. A head spring can be used for this purpose, for example. The head spring can then apply a force to the valve element, so that in a home position, that is, the first position, the valve element is pressed against the dispensing opening and closes off said dispensing opening. The closing surface of the valve element is thus pressed against the dispensing opening. However, this does not exclude that, for example, a pin arranged on the valve element, which pin does not perform a sealing function, will protrude into the dispensing opening. Once a fluid has collected in the valve chamber, for example, the fluid can displace the valve element against the spring force of the head spring if there is sufficient pressure. Thus, using the magnitude of the spring force, it is possible to determine the fluid pressure at which the valve element moves and therefore opens or clears the dispensing opening. The force fit additionally ensures that the dispensing opening is already opened with a sufficiently large counterforce, that is, a force which counteracts the force fit. The result of this is that an immediate opening of the dispensing opening occurs once the valve element is moved. As an alternative to a head spring, the force fit could also take place by means of different spring elements or via fluid pressures.

Furthermore, on an end side of the liner opposite from the valve element, a plug can be arranged, at least in regions, inside of the liner. The plug is thus arranged in regions in the tubular liner. As a result, an ingress of fluid into the liner can be prevented at the end side thereof opposite from the dispensing opening. At the same time, the plug can also be used to conduct a fluid, for example from a fluid channel, into the liner channel. If the dispensing device includes a pump chamber, for example, the ingress of the fluid into the interior of the liner without a prior flow through the liner channel is prevented by the plug. The plug thus ensures that no undesired fluid flows occur. At the same time, the plug stabilizes the dispensing device.

Additionally, in an alternative embodiment, the dispensing device includes a head spring which is arranged in a spring space inside of the liner, and wherein the head spring presses the valve element in the direction of the dispensing opening. The head spring can be braced on one side against the plug or a projection or the like, and can be compressed during a movement of the valve element from the first position thereof into the second position. Through the use of a plug, an undesired ingress of fluid into the spring space can be prevented. The plug can thus prevent an undesired influence on the head spring, for example, by corrosion of the head spring. Additionally, the force fit can be regulated via the head spring.

The dispensing device can furthermore include a snap-on element, wherein the head base piece is arranged on the snap-on element. In this case, the snap-on element can be immovably arranged relative to the head base piece. Preferably, an intermediate spring is located between the snap-on element and the head base piece. Said intermediate spring presses the snap-on element and the head base piece apart from one another when the valve element is located in the first position. Once the snap-on element and the head base piece are displaced towards one another against the spring force of the intermediate spring, this can result in a pumping action which conveys a fluid through a fluid channel in the direction of the liner channel. Alternatively, the dispensing device can comprise an enclosure spring which can be compressed by a relative movement of the snap-on element and head base piece. Accordingly, the intermediate spring or the enclosure spring can then help to ensure that the dispensing device is automatically transferred back into the first position thereof. Furthermore, as a result of the pumping, a fluid pressure that moves the valve element from the first position into the second position can be built up.

Embodiments are directed to a dispensing device for dispensing a fluid that includes a head base piece having a dispensing opening, a liner arranged inside of the head base piece, a liner channel which is arranged between the head base piece and the liner, and a valve element that is movably arranged, at least in regions, inside of the liner and interacts with the dispensing opening. The valve element is movable from a first position into a second position via a stroke relative to the liner, such that, in the second position of the valve element, a fluid path is formed between the liner channel and the dispensing opening, and in the first position, the liner channel is sealed against the dispensing opening by the liner.

In embodiments, the liner may include at least one of a second sealing lip or a sealing surface that bears against the valve element in the first position.

According to embodiments, the liner can include a breach which forms a portion of the fluid path.

In accordance with other embodiments, the valve element may include a first sealing lip that bears against the liner in the first position and in the second position.

In still other embodiments, the liner can include a shoulder in a region of the valve element.

According to further embodiments, the dispensing device may also include at least one of a chamber arrangement or a nozzle chamber. The at least one of the chamber arrangement or the nozzle chamber can form a portion of the fluid path. Moreover, in the first position, the liner channel and the chamber arrangement may be in fluid connection. Alternatively, in the first position, the liner channel and the nozzle chamber may not be in fluid connection in the first position.

Further, at least one of: the dispensing opening and the nozzle chamber; or the chamber arrangement and the liner channel is in fluid connection in the second position of the valve element. The liner can protrude, at least in regions, into the nozzle chamber.

In accordance with other embodiments, the liner may be immovably arranged relative to the head base piece.

In other embodiments, the valve element can seal the dispensing opening with a force fit.

According to still further embodiments, the dispensing device may include a plug that is arranged on an end side of the liner opposite from the valve element and that, at least in regions, is inside of the liner.

In still other embodiments, the dispensing device may include a head spring arranged in a spring space inside of the liner. The head spring can press the valve element in a direction of the dispensing opening.

In accordance with still yet other embodiments, the dispensing device may include a snap-on element, on which the head base piece is arranged. Further, an intermediate spring can be arranged between the snap-on element and the head base piece. Alternatively or additionally, the dispensing device may further include an enclosure spring.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1A:
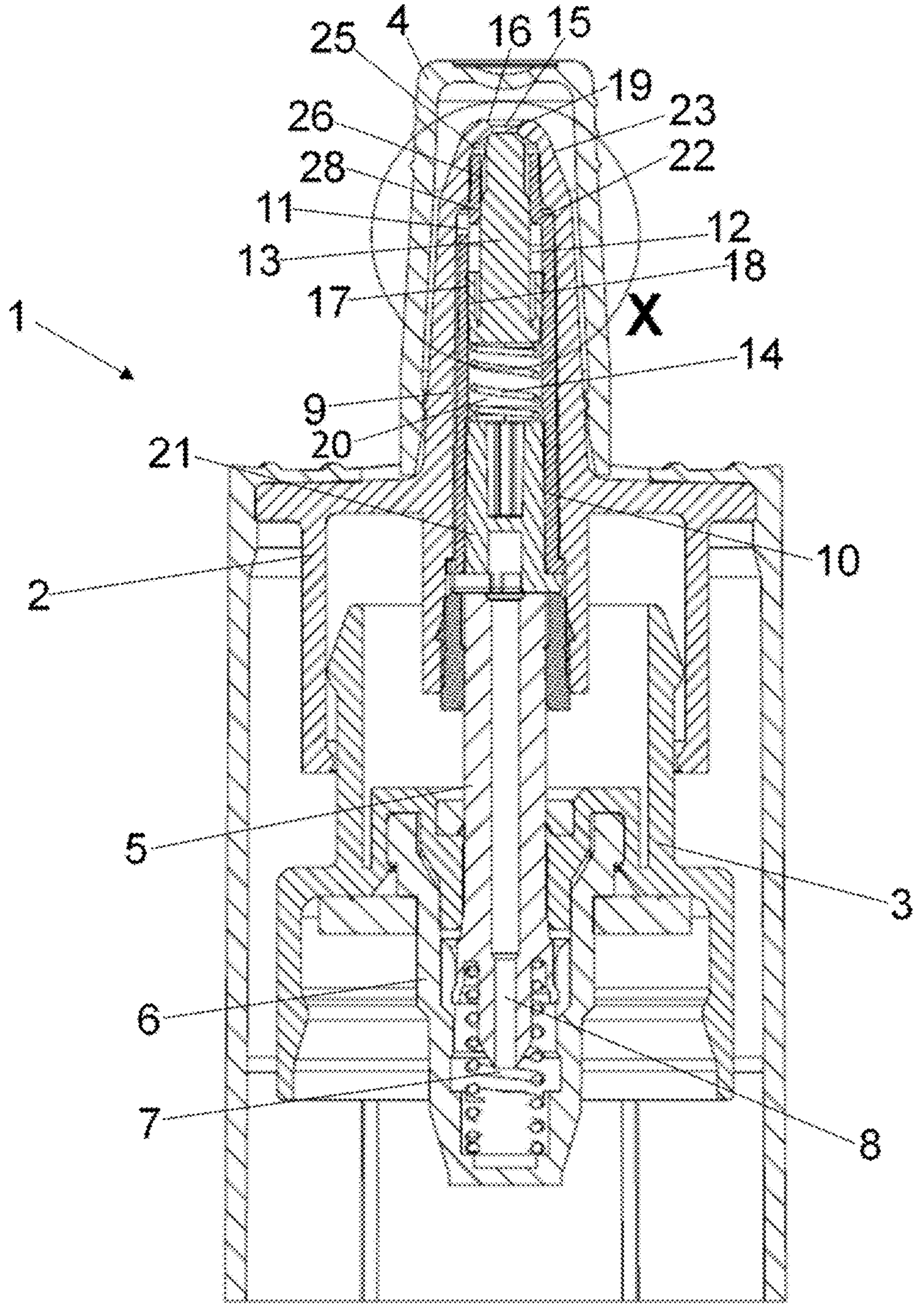
FIG. 1A schematically shows a sectional illustration of an embodiment of a dispensing device according to the invention in a first (closed) position.

FIG. 1A shows an embodiment of a dispensing device 1 for dispensing a fluid. The dispensing device 1 comprises a head base piece 2 that is arranged on a snap-on element 3. The head base piece 2 is provided with a removable closing cap 4 which, during the use of the dispensing device 1, can be removed therefrom (see also FIGS. 3 and 4). A cone 5 extends from the head base piece 2 into an enclosure 6 through the snap-on element 3 in an axial direction. The cone 5 interacts with an enclosure spring 7 in the enclosure 6. The cone 5 comprises a fluid channel 8. The fluid channel 8 extends towards the head base piece 2 in the axial direction.

Figure 1B:
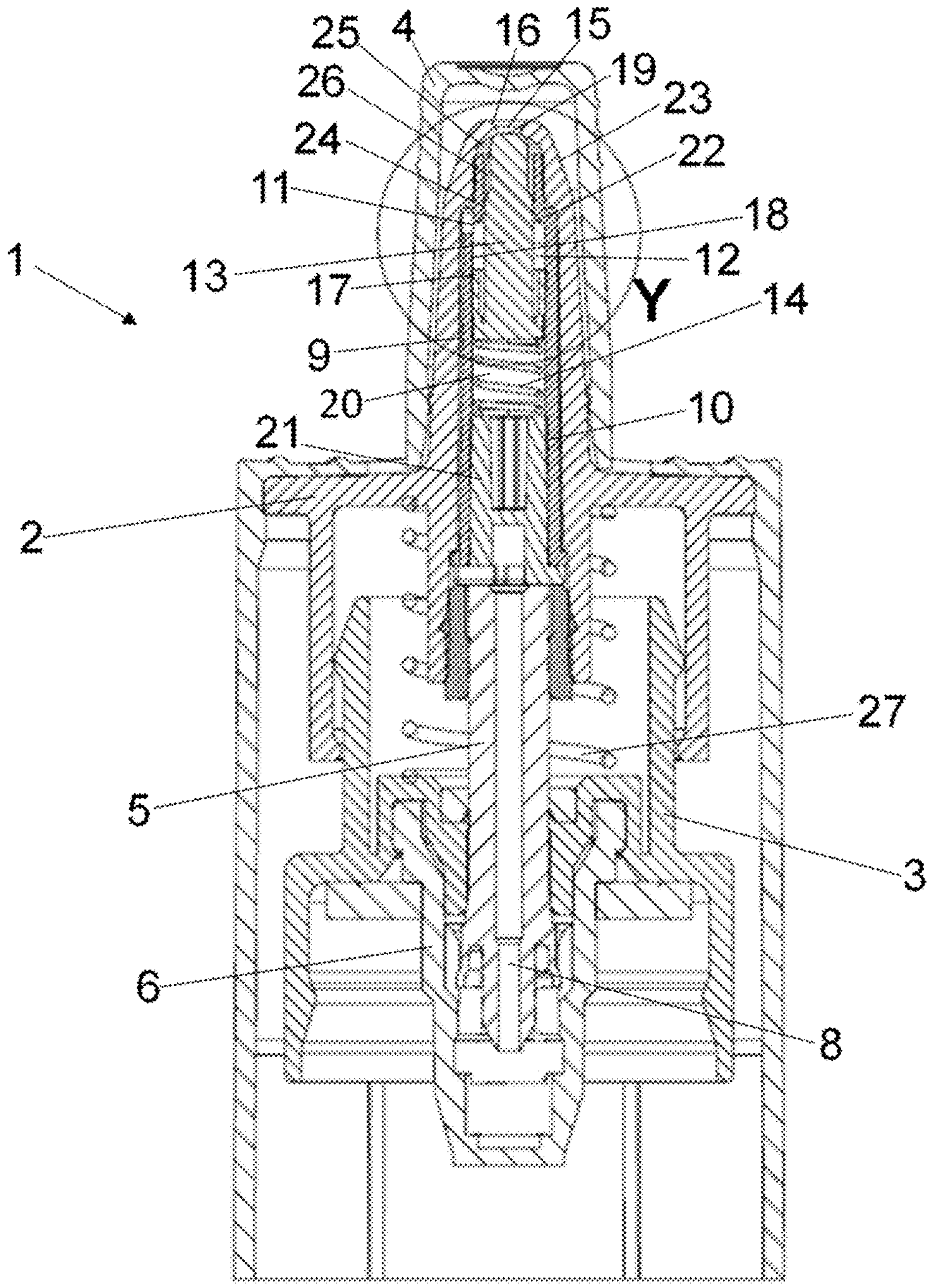
FIG. 1B schematically shows a sectional illustration of an alternative embodiment of a dispensing device according to the invention having an intermediate spring and second sealing lip in a first (closed) position.

As an alternative to the embodiment illustrated in FIG. 1A with an enclosure spring 7, an intermediate spring 27 can also be arranged between the snap-on element 3 and the head base piece 2, as is illustrated in FIG. 1B. The intermediate spring 27 then presses the snap-on element 3 and the head base piece 2 apart from one another in the first position.

The fluid channel 8 continues into a liner channel 9 in the head base piece 2. Said liner channel 9 is arranged between the head base piece 2 and a liner 10. The liner 10 is embodied in one piece. Furthermore, the liner 10 comprises a breach 11, whereby the liner channel 9 opens into a chamber arrangement 12.

In addition, the dispensing device 1 comprises a valve element 13 which sits such that it is movably arranged in the liner 10. In the first position of the valve element 13 shown here, the valve element 13 is pressed against a dispensing opening 15, which is embodied in the form of a calotte 16, by a head spring 14. The dispensing opening 15 is thus closed off by the valve element 13.

The valve element 13 comprises a first sealing lip 17 which bears against an inner wall 18 of the liner 10. At an end of the valve element 13 opposite from the first sealing lip 17, the valve element 13 comprises a closing surface 19 with rounded edges. The closing surface 19 presses against the dispensing opening 15 and seals said opening in the first position of the valve element 13.

The first sealing lip 17 spatially partitions a region of the chamber arrangement 12, and in particular a valve chamber, from a further region. Said further region, in which the head spring 14 is arranged, is referred to as the spring space 20. On the end side opposite from the valve element 13, the liner 10 comprises a plug 21 that is slid into the liner 10 up to a stop. The plug 21 forms a contact surface of the head spring 14 and, at the same time, the transition between the fluid channel 8 and liner channel 9.

The liner 10 also comprises a shoulder 22, whereby the inner diameter $D_1$ of the liner 10 in a region closer to the dispensing opening 15 is decreased compared to a rearward region. For the sake of clarity, the inner diameter $D_1$ is only denoted in FIGS. 2A, 2B and 5.

In the embodiment illustrated here, the liner 10 tapers conically, independently of the shoulder 22, so that, for example, the inner diameter $D_1$ of the liner 10 in the region of the first sealing lip 17 is smaller than in the region of the plug 21. The same applies to the forward region of the head base piece 2, wherein the outer counter 23 of the head base piece 2 likewise tapers conically.

In the forward region with the decreased inner diameter $D_1$, the liner 10 of the embodiment according to FIG. 1A additionally comprises a sealing surface 28 which bears against the valve element and seals the chamber arrangement 12 against a nozzle chamber 25. The sealing surface 28 thereby denotes a surface section of the liner 10 which, at least in regions, bears flat against the valve element 13 in the first position of the valve element 13.

As an alternative to the sealing surface 28, the liner 10 according to FIG. 1B comprises a second sealing lip 24, which bears against the valve element 13 and seals the chamber arrangement 12 against the nozzle chamber 25. The sealing surface 28 is thereby located in the forward region of the liner 10 with the decreased inner diameter $D_1$. The embodiments from FIGS. 1A and 1B thus differ merely with respect to the features of the enclosure spring 7 and the intermediate spring 27, and of the second sealing lip 24 and the sealing surface 28.

The nozzle chamber 25 comprises the dispensing opening 15. In addition, the second sealing lip 24, or the sealing surface 28, forms a valve seat in the first valve element position. As a result, the nozzle chamber 25 is sealed against the chamber arrangement 12, and therefore against the liner channel 9, in the first position of the valve element 13.

The valve element 13 additionally comprises a space 26 that is arranged inside of the nozzle chamber 25 in the embodiments illustrated in FIGS. 1A and 1B and FIGS. 2A and 2B.

Figure 2A:
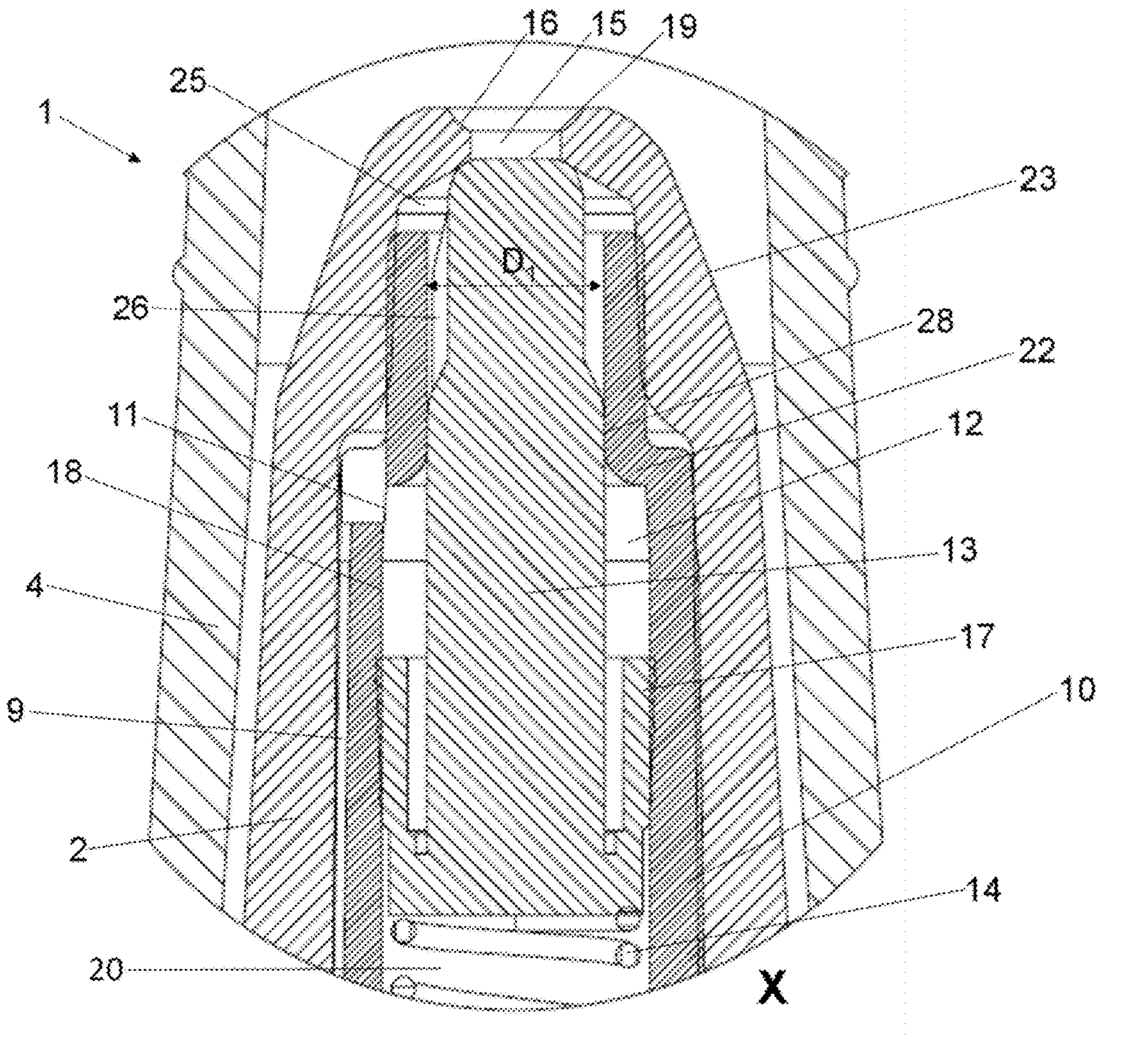
FIG. 2A schematically shows a detailed view of a section X from FIG. 1A.
Figure 2B:
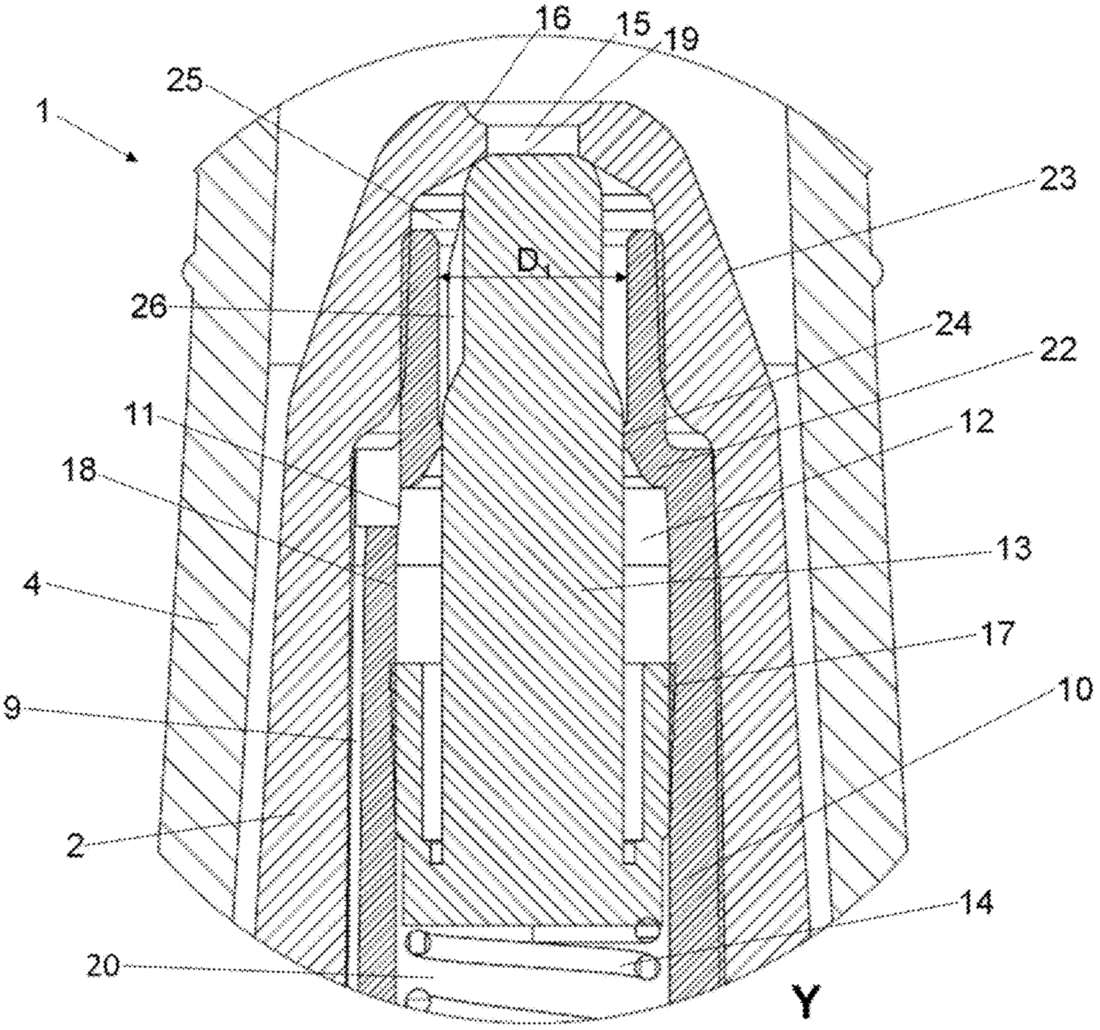
FIG. 2B schematically shows a detailed view of a section Y from FIG. 1B.

In FIGS. 2A and 2B, detailed views of the forward region of the dispensing device 1 from FIGS. 1A and 1B, respectively, are shown, that is, of the section X and of the section Y, respectively. In FIGS. 2A and 2B, the inner diameter $D_1$ of the liner 10 is additionally indicated.

Figure 3:
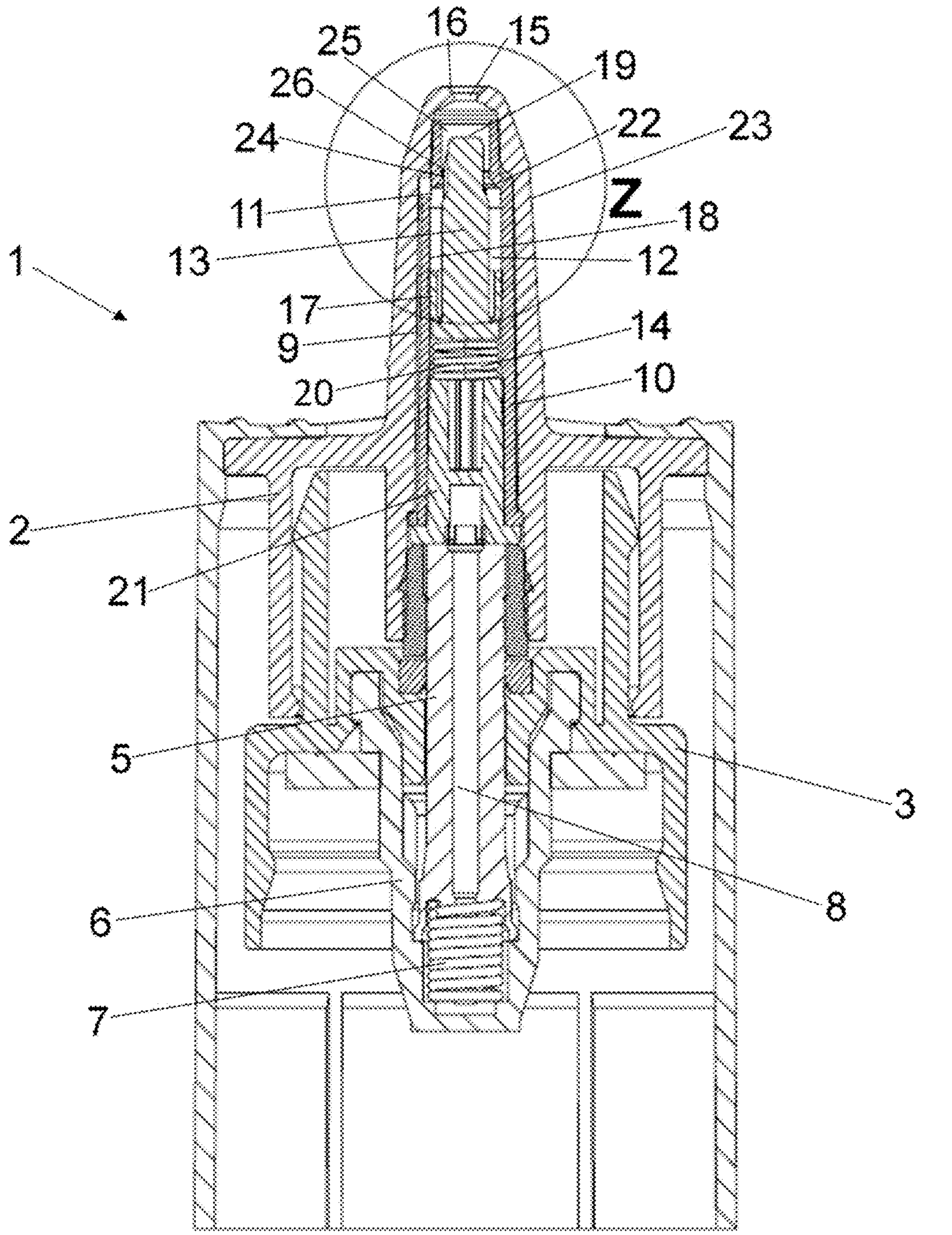
FIG. 3 schematically shows a sectional illustration of a dispensing device according to FIG. 1A in a second (open) position.
Figure 4:
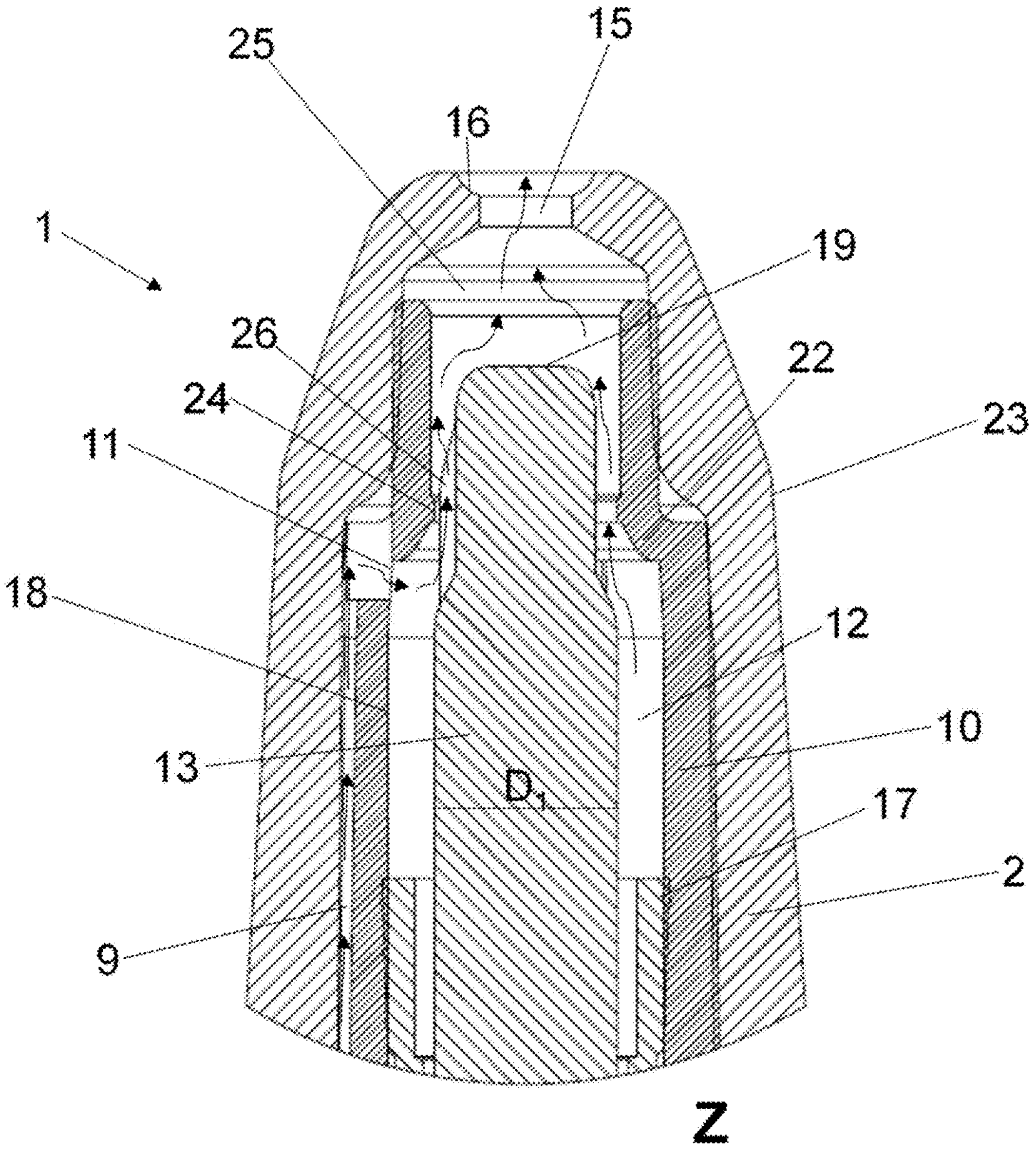
FIG. 4 schematically shows a detailed view of a section Z from FIG. 3.

In FIG. 3, the embodiment according to FIGS. 1B and 2B is essentially illustrated in a second, open position of the valve element 13, wherein the embodiment in FIG. 3 comprises no intermediate spring 27, but has an enclosure spring 7. FIG. 4 shows a detailed view of the section Z from FIG. 3. Furthermore, in FIGS. 3 and 4, an altered position of the valve element 13, that is, the second position, in which the fluid path is open, is illustrated.

In the valve position illustrated in FIG. 3, the valve element 13 has been pressed back into the liner 10, so that the space 26 clears the fluid path from the liner channel 9, through the breach 11, via the chamber arrangement 12, the space 26, the nozzle chamber 25, and the dispensing opening 15. In this position, the valve element 13 is then only guided in the liner 10 via the first sealing lip 17. The head spring 14 has been compressed accordingly, and the spring space 20 has been reduced compared to the chamber arrangement 12. The second sealing lip 24 and the space 26 overlap.

FIG. 4 depicts a corresponding detailed view of the forward region of the dispensing device 1 from FIG. 3, that is, of the section Z. The fluid path is denoted by arrows in this case.

Figure 5:
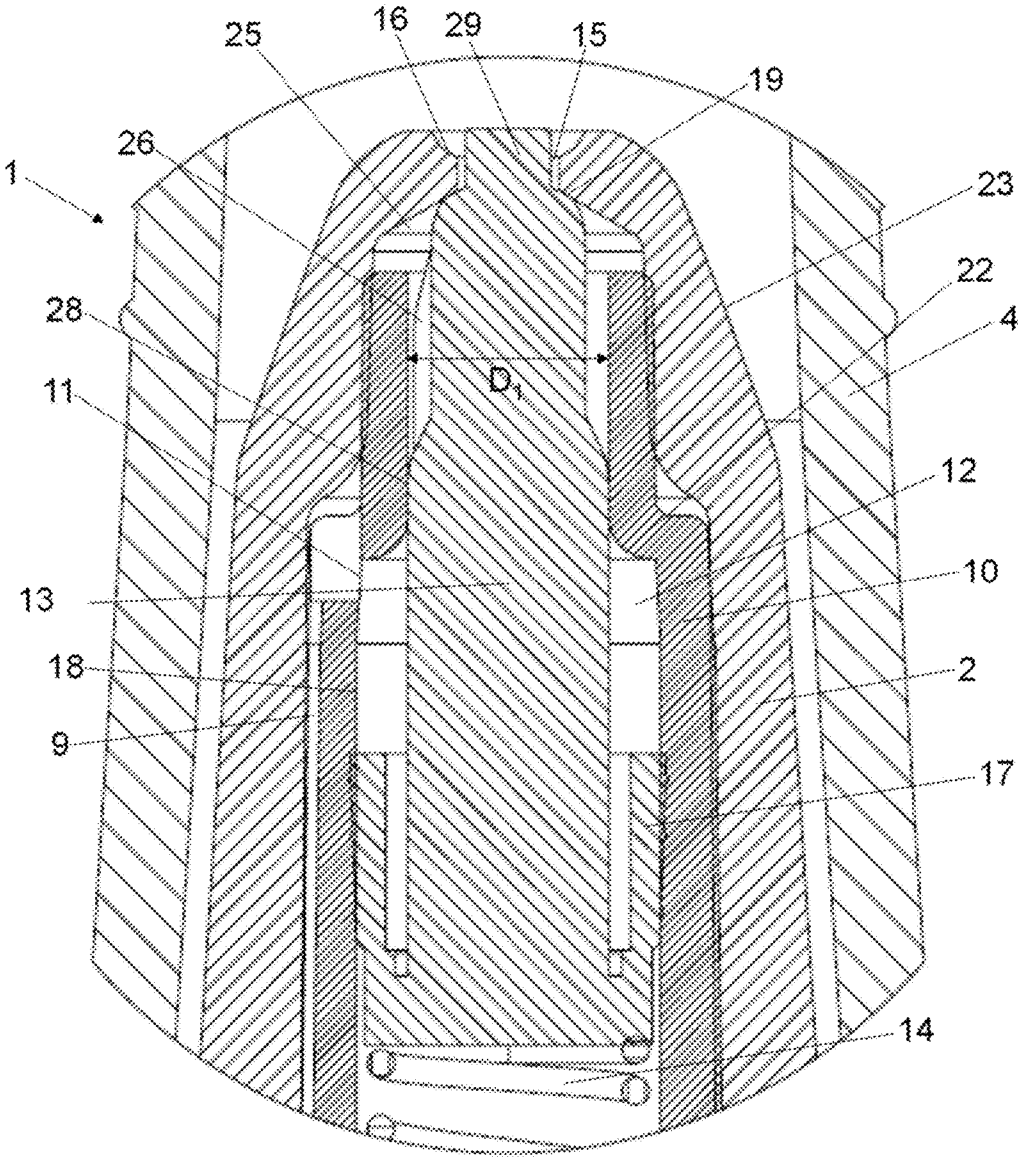
FIG. 5 schematically shows a detailed view in sectional illustration of a further embodiment of a dispensing device having a pin in a first (closed) position.

In all figures and embodiments, the identical features have been provided with the identical reference symbols. FIGS. 1A and 1B thereby depict a state of the dispensing device 1 in which the valve element 13 is arranged in a closed state, that is, in a first position. In contrast, FIG. 3 shows the same dispensing device 1 in which the valve element 13 is arranged in an open state, that is, in a second position. FIG. 5 also shows an alternative embodiment of the valve element 13, wherein a pin 29 is additionally arranged on the closing surface 19.

The pin 29 has a cylindrical shape in the embodiment illustrated in FIG. 5. The pin 29 does not bear against the dispensing opening 15, and thus also does not perform a sealing function. The dispensing opening 15 therefore continues to be sealed by the closing surface 19 in the first position of the valve element 13.

The pin 29, which is seated in the dispensing opening 15 of the dispensing device 1, has no sealing function at all, which is indicated by a small gap. However, the pin 29 does reduce the dead volume in the outer region of the dispensing device. Accordingly, deposits of debris can be partially minimized thereby. In addition, in a second (open) position of the valve element 13, the pin 29 can improve the drip behavior of the fluid, for example in that less fluid collects at the calotte 16. This facilitates the subsequent drying of residual fluid after a drip process has occurred.

To dispense the fluid, a user moves the head base piece 2 towards the snap-on element 3 in the axial direction after the closing cap 4 has been removed from the dispensing device 1. As a result, the cone 5 is moved against the spring force of the enclosure spring 7 or of the intermediate spring 27 in the interior of the enclosure 6. The volume in a pump chamber of the enclosure 6 thereby decreases. The pump chamber is formed by a space surrounding the enclosure spring 7. If no enclosure spring 7 is present, the pump chamber is still formed by the same space as with the enclosure spring 7. The conveyed amount of fluid is determined by a stroke of the cone 5 inside of the pump chamber. The dosage of a predetermined amount of fluid is hereby rendered possible. By way of the resulting overpressure, the fluid is displaced into the fluid channel 8 from the pump chamber. The fluid is transported along the fluid channel 8 in an axial direction. The transport of the fluid continues along the liner 10 through the liner channel 9. At an axial end of the liner channel 9, the fluid ultimately passes through a breach 11 and enters a chamber arrangement 12.

In the embodiment illustrated here, a certain collection of fluid results in the chamber arrangement 12. The more fluid collects in the chamber arrangement 12, the greater the pressure of the fluid on the valve element 13. The chamber arrangement 12 is thereby sealed by the first sealing lip 17 against the spring space 20 in which the head spring 14 is arranged. Furthermore, the chamber arrangement 12 is, in the first position of the valve element 13, sealed against the nozzle chamber 25 by the second sealing lip 24 (FIGS. 1B and 2B) or by the sealing surface 28 (FIGS. 1A and 2A). The fluid collecting in the chamber arrangement 12 thus displaces the valve element 13 against the spring force of the head spring 14.

Once the fluid pressure lessens, however, and the spring force becomes greater than the fluid pressure, the valve element 13 moves back into the first position thereof and closes off the dispensing opening 15 with the closing surface 19. This force fit is then produced by the head spring 14, wherein a slight movement of the valve element 13 away from the dispensing opening 15 is already sufficient to open the dispensing opening 15. The opening of the dispensing opening 15 does not mean, however, that the fluid path is also already cleared. As long as the second sealing lip 24 still bears against the valve element 13, the fluid path is interrupted. Not until the space 26, which can be embodied as a groove, brings the chamber arrangement 12 and the nozzle chamber 25 into fluid connection with one another can the fluid also flow out of the dispensing opening 15 from the liner channel 9. The stroke of the valve element 13 thus continues until the second sealing lip 24 reaches and clears the space 26. Therefore, an overlap of the second sealing lip 24 and the space 26 must occur in order for the fluid path to be cleared. Up to this point, the second sealing lip 24 seals against the valve element 13. Accordingly, the fluid pressure must be greater than the spring force of the head spring 14 in order to displace the valve element 13 and clear the fluid path.

Once the space 26 and the second sealing lip 24 interact such that the fluid path is cleared, the fluid located in the chamber arrangement 12 can enter the space 26, from where it can flow into the nozzle chamber 25. The volume of the chamber arrangement 12 is thereby greater than the volume of the space 26, whereby the fluid is accelerated upon entering the space 26. This acceleration is undesired if a controlled dispensing of the fluid in the form of drops is intended. For this reason, the nozzle chamber 25 preferably has a larger volume or a larger cross section than the space 26. The nozzle chamber 25 is also arranged after the space 26 in the transport direction of the fluid. The fluid accelerated in the space 26 can thus expand in the nozzle chamber 25. As a result, the fluid is decelerated. The nozzle chamber 25 then comprises the dispensing opening 15. The fluid can exit from the dispensing opening 15 along the calotte 16 in the form of drops.

The embodiment according to the invention thus provides an improved dispensing device 1 with a reduced number of components. At the same time, the chosen design according to the invention enables an earlier opening of the fluid path and a thereby improved opening characteristic of the dispensing device 1. If the dispensing device 1 comprises a head spring 14, the spring path of the head spring 14, which path is needed for the clearing of the fluid path, can also be shortened compared to the prior art, so that the closing characteristic of the dispensing device 1 is additionally improved.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE SYMBOLS

1 Dispensing device
2 Head base piece
3 Snap-on element
4 Closing cap
5 Cone
6 Enclosure
7 Enclosure spring
8 Fluid channel
9 Liner channel
10 Liner
11 Breach
12 Chamber arrangement
13 Valve element
14 Head spring
15 Dispensing opening
16 Calotte
17 First sealing lip
18 Inner wall (of the liner)
19 Closing surface
20 Spring space (of the head spring)
21 Plug
22 Shoulder
23 Outer contour (of the head base piece)
24 Second sealing lip
25 Nozzle chamber
26 Space
27 Intermediate spring
28 Sealing surface
29 Pin
$D_1$ Inner diameter

What is claimed:

1. A dispensing device for dispensing a fluid, comprising:
- a head base piece having a dispensing opening;
- a liner arranged inside of the head base piece;
- a liner channel which is arranged between the head base piece and the liner; and
- a valve element that is movably arranged, at least in regions, inside of the liner and interacts with the dispensing opening, wherein the valve element is movable from a first position into a second position via a stroke relative to the liner, such that, in the second position, a fluid path is formed between the liner channel and the dispensing opening, and in the first position, the liner channel is sealed against the dispensing opening by the liner so that, in the first position, the fluid path from the liner channel to the dispensing opening is interrupted as the valve element interacts with the liner.

2. The dispensing device according to claim 1, wherein the liner comprises at least one of a second sealing lip or a sealing surface that bears against the valve element in the first position.

3. The dispensing device according to claim 1, wherein the liner comprises a breach which forms a portion of the fluid path.

4. The dispensing device according to claim 1, wherein the valve element comprises a first sealing lip that bears against the liner in the first position and in the second position.

5. The dispensing device according to claim 1, wherein the liner comprises a shoulder in a region of the valve element.

6. The dispensing device according to claim 1, further comprising at least one of a chamber arrangement or a nozzle chamber, wherein the at least one of the chamber arrangement or the nozzle chamber forms a portion of the fluid path.

7. The dispensing device according to claim 6, wherein, in the first position, the liner channel and the chamber arrangement are in fluid connection.

8. The dispensing device according to claim 6, wherein, in the first position, the liner channel and the nozzle chamber are not in fluid connection in the first position.

9. The dispensing device according to claim 6, wherein at least one of:
- the dispensing opening and the nozzle chamber; or
- the chamber arrangement and the liner channel is in fluid connection in the second position of the valve element.

10. The dispensing device according to claim 6, wherein the liner protrudes, at least in regions, into the nozzle chamber.

11. The dispensing device according to claim 1, wherein the liner is immovably arranged relative to the head base piece.

12. The dispensing device according to claim 1, wherein the valve element seals the dispensing opening with a force fit.

13. The dispensing device according to claim 1, further comprising a plug that is arranged on an end side of the liner opposite from the valve element and that, at least in regions, is inside of the liner.

14. The dispensing device according to claim 1, further comprising a head spring arranged in a spring space inside of the liner, wherein the head spring presses the valve element in a direction of the dispensing opening.

15. The dispensing device according to claim 1, further comprising a snap-on element, the head base piece being arranged on the snap-on element.

16. The dispensing device according to claim 15, further comprising an intermediate spring arranged between the snap-on element and the head base piece.

17. The dispensing device according to claim 15, further comprising an enclosure spring.

* * * * *